(12) United States Patent
Drinkhorn

(10) Patent No.: US 7,464,916 B1
(45) Date of Patent: Dec. 16, 2008

(54) CARGO STRAP WINCH REWINDING TOOL

(76) Inventor: Joseph A. Drinkhorn, 15371 Turner, Lynn Township, MI (US) 48097

( * ) Notice: Subject to any disclaimer, the term of this patent is extended or adjusted under 35 U.S.C. 154(b) by 0 days.

(21) Appl. No.: 11/810,655

(22) Filed: Jun. 6, 2007

(51) Int. Cl.
B21F 9/00 (2006.01)

(52) U.S. Cl. .................. 254/243; 74/545; 410/103; 16/422; 16/436

(58) Field of Classification Search .......... 254/217, 254/218, 243; 410/103, 100, 156; 16/422, 16/436; 74/545
See application file for complete search history.

(56) References Cited

U.S. PATENT DOCUMENTS

| | | | |
|---|---|---|---|
| 3,428,331 A | 2/1969 | Morgan | |
| 3,954,226 A | 5/1976 | Pickering | |
| 4,007,887 A | 2/1977 | Vice | |
| 4,266,740 A | 5/1981 | Ramos et al. | |
| 4,311,288 A | 1/1982 | Galland | |
| 4,338,827 A * | 7/1982 | Hooker | 74/545 |
| 4,390,141 A | 6/1983 | Webster | |
| 4,842,458 A | 6/1989 | Carpenter | |
| 4,900,203 A | 2/1990 | Pope | |
| 5,255,573 A * | 10/1993 | Estabrook | 74/545 |
| 5,775,175 A * | 7/1998 | Salemno et al. | 74/545 |
| 5,791,844 A * | 8/1998 | Anderson | 410/103 |
| 5,961,061 A | 10/1999 | Stanley | |
| 5,961,263 A | 10/1999 | Nuenz | |
| 5,975,454 A | 11/1999 | Potter et al. | |
| 6,056,488 A | 5/2000 | Depoy | |
| 6,059,499 A | 5/2000 | Bird | |
| 6,068,210 A | 5/2000 | Risa | |
| 6,102,637 A | 8/2000 | Mocci | |
| 6,139,233 A * | 10/2000 | Wilsey | 410/100 |
| 6,200,079 B1 | 3/2001 | Little | |
| 6,398,147 B1 | 6/2002 | Fredrickson | |
| 6,467,716 B1 * | 10/2002 | Hamilton | 242/394 |
| 6,467,755 B2 | 10/2002 | Reilly et al. | |
| 6,626,621 B1 | 9/2003 | Hugg | |
| 6,659,697 B1 | 12/2003 | Guenther | |
| 6,705,597 B1 | 3/2004 | Reilly et al. | |
| 6,719,507 B2 * | 4/2004 | Botelho | 410/100 |
| 6,729,604 B1 | 5/2004 | Claycomb | |
| 6,824,339 B1 | 11/2004 | Childers | |
| 6,854,939 B2 | 2/2005 | Im | |
| 6,916,143 B2 | 7/2005 | Guenther | |
| 6,966,543 B2 | 11/2005 | Loudamy | |
| 7,059,588 B2 | 6/2006 | Goulet | |
| 7,108,246 B2 | 9/2006 | Fortin | |
| 7,114,705 B2 * | 10/2006 | Steiner | 254/266 |
| 7,128,307 B2 * | 10/2006 | Dow | 254/342 |

* cited by examiner

Primary Examiner—Emmanuel M Marcelo
(74) Attorney, Agent, or Firm—VanOphem & VanOphem, P.C.

(57) ABSTRACT

A winch bar is provided for use in combination with a strap winding winch for flatbed trailers. The bar has a rotatable link member at one end thereof which is provided with a hook portion adapted to interface with the apertures of the hub on one end of a reel of the winch. Upon the hook engaging the apertures, the bar can be rotated at a safe distance from the truck bed in order to rapidly, safely and securely rewind the strap onto the winch reel.

8 Claims, 3 Drawing Sheets

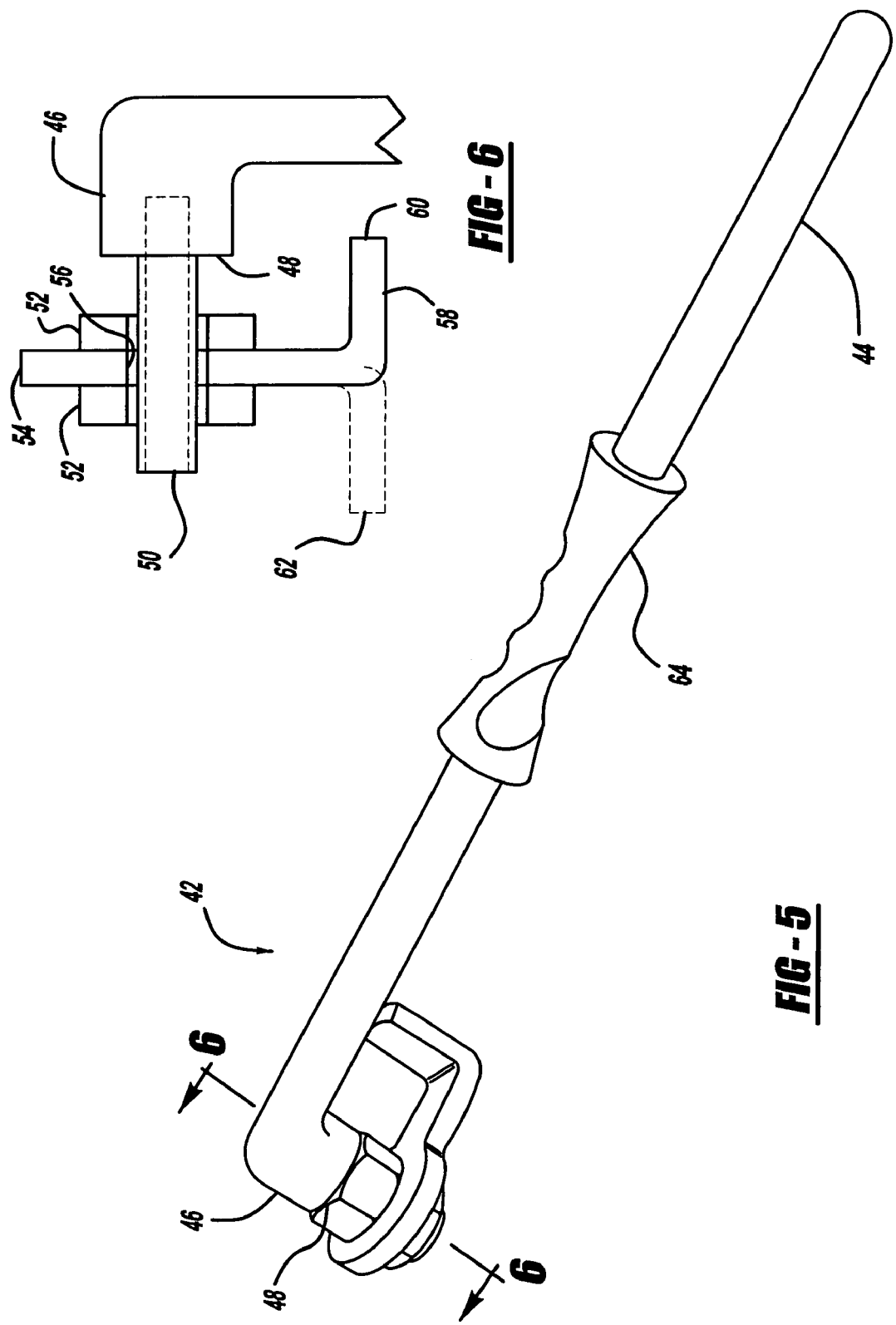

CARGO STRAP WINCH REWINDING TOOL

CROSS-REFERENCE TO RELATED APPLICATIONS

Not applicable.

FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates to a hand tool that allows convenient winding or rewinding of a strap onto a winch, and more particularly, to an apparatus that provides rapid winding or rewinding onto a winch of a load strap of the type used to secure cargo on a flatbed of a truck.

2. Description of the Related Art

Over the road trucking is the most economical common carrier available today to transport relatively large loads of commodities such as lumber, building materials, gardening supplies, cement or plastic culverts, steel rolls, and the like. These and other commodities are generally transported on flatbed carriers such as trucks, semi-trailers, and full-trailers to move these goods on roads and highways. To maintain economic transportation advantages, the loads are large and generally have a high profile. Therefore, in order to maintain these loads on the flatbed trailers, binders, or straps under high tension must be used to hold the loads fixed on the truck beds during the transportation mode. For this purpose tie-down devices are used in the form of a plurality of winches that are selectively mounted on a side bar rail which is attached to the bottom or side of one side of the vehicle bed. Typically, the winch utilizes a ratchet and cam mechanism that is selectively disengaged from the ratchet so that when one end of the strap is inserted into the winch and passed over the cargo with the opposite end of the strap being directly fixed to the opposite side of the trailer bed. The strap is pulled tight to engage the load. When the desired tension is obtained, the cam re-engages the ratchet to prevent the strap from further unwinding.

To obtain sufficient tension on the strap, the driver will often use a wrench tool or bar. Since the bar is used to obtain sufficient leverage to tension the strap, the tip of the bar is generally sized to fit the hole in the winch hub so as to enable the driver to fit the tip of the bar into the winch hub and get sufficient leverage to turn the winch rotating cylinder a quarter turn with each placement of the winch bar.

After the vehicle has delivered the load to its destination, the strap is disengaged from the load, the load is unloaded, and the strap needs to be rewound onto the winch. Rewinding the loading strap is a very tedious process since as many as ten to twelve winches may be mounted along the longitudinal length of the flatbed truck. Rewinding all of the loading straps is a costly, time consuming process whether it is accomplished by the driver or other unloading personnel. A further problem associated with the rewinding of the straps of the various winches mounted on a flatbed vehicle is that of safety. Since most of the winches are mounted along the underneath edge of the flatbed, any tool that is used to assist in the rewinding of the strap must take into account the lack of space between the winch and the steel plate that generally is mounted at the edge of the flatbed. It is not uncommon for a user of a tool to assist in the rewinding of the strap to injure a hand or forearm as a result of the hand slipping from the tool and colliding with the edges of the flatbed.

Many solutions to this ongoing problem have been proposed in the prior art. For example, Webster, U.S. Pat. No. 4,390,141, proposes the use of an L-shaped frame having a first leg clamped to a selected stake hole of a conventional flatbed truck with a right angle second leg extending horizontally in a direction away from the truck bed. Intermediate the ends of the second leg, a strap reel handle and strap reel assembly are journalled for relative engagement during the winding operation. Stanley, U.S. Pat. No. 5,961,061, also proposes a specially designed holding means to attach to a truck rub rail with a C-clamp.

Mocci, U.S. Pat. No. 6,102,637, discloses a strap winding tool which utilizes the existing winch holes designed to accept the winch bar. A hook configuration at the end of the winding tool provides a positive engagement to the winch drum. The winding tool is bent in a fashion that enables the user to rotate the rod using a simple hand motion while grasping steel sleeves mounted on the winding bar.

Power actuated winding tools are also proposed in the prior art to solve the problem. Reilly et al., U.S. Pat. No. 6,705,597, discloses a sleeve tool that is inserted into the axial opening of the winch spindle. The tool includes a longitudinal slot that receives the inner end of the strap. The opposite end of the tool terminates in a head portion that is lockably interchangeable with a drive component of a powered drive apparatus such as a power drill or a hand crank. Similarly, Claycomb, U.S. Pat. No. 6,729,604, discloses a hand crank which is attached to a spindle having an engagement pin that fits inside the hole in the winch drum. The hand crank can be replaced with a power driven device allowing the operator to rapidly and conveniently rewind the load securing strap.

Finally, Goulet, U.S. Pat. No. 7,059,588, discloses a strap winder which is actuated by a power operated driver, e.g., a pneumatic torque, a wrench, or an electric, pneumatic, or hydraulic motor and includes a shaft having at one end, a slot configured for receipt of a strap and an opposite end configured to connect with the power operated driver.

The problem with most of the prior art devices proposed to rewind truck cargo straps is that many are quite cumbersome, require considerable time to mount or secure to the cargo bed and/or winch, and few provide any protection from possible damage to the operator's hands where the winding device is operated near the edge of the truck bed and the operator's hand inadvertently slips off the winding tool and/or handle resulting in scrapes and bruises caused by the metal edge of the truck bed because there is very little clearance between the winding handle and the truck bed or guide rail to which the winch is mounted.

BRIEF SUMMARY OF THE INVENTION

The present invention provides a truck cargo strap rewinding tool that requires no modification of a typical winch, enables rewinding of a winch cargo strap at a safe distance away from the truck bed so as to avoid any injury to the user's limbs by inadvertent interference with the winch or vehicle cargo bed, is very simple to operate, is easy to use, and requires no alteration of the typical cargo strap winch used in the prior art.

In accordance with the above stated advantageous features, the present invention provides a cargo strap rewind tool bar having a unique combination of features allowing the invention to perform the task of rewinding the winch strap webbing with speed, convenience, and safety never before enjoyed by any prior art device used for this task. The winch winding tool bar has at one end thereof a pivotable hook link configuration to provide positive engagement with the existing winch hub holes designed to accept a prior art winch bar. The hook is rotatably suspended about a shaft portion which is attached to the terminal end of the handle. The handle has a transverse boss terminating in a shoulder to which the shaft is mounted. Straddling the hook link and mounted on the shaft are two thrust washers which may take the form of threaded bolts if the shaft is threaded. The thrust washers are spaced on either side of the rotatable hook link to provide a predetermined clearance so that the hook link can rotate about the shaft and is able to move axially along the shaft. Some distance along the tool bar, there is provided an ergonomic hand grip which provides a holding position of the bar so that after the hook link is positively engaged to the holes in the hub of the winch, the tool bar can be conveniently held by the hand grip with one hand and manipulated to rapidly rewind the load strap onto the rotating cylinder of the winch while the other hand can easily be used to guide the strap, during rewinding, if necessary. Opposite to the end having the hook link attached is a reduced diameter portion which as in prior art tool bars can be used to insert the reduced diameter portion into the holes of the winch hub to assist in tensioning the strap to secure it from coming loose when cargo is loaded on the bed of a truck.

It is therefore an object of the invention to provide a new truck bed cargo strap rewind toolbar which is economical to manufacture.

It is a further object of the invention to provide a new truck bed cargo strap rewinding tool bar which is securely attached to existing winch holes and is adapted to extend in a direction away from the truck bed to provide a working environment whereupon rewinding of the winch can be accomplished at a safe distance from the truck bed to prevent injury to the user's hand by accidentally sliding off the handle and ramming the truck cargo bed resulting in significant injury to the user of the tool bar.

It is yet a further object of the invention to provide a truck bed cargo strap tool bar which allows the user to use only one hand to rewind the strap while the other hand is used to keep the strap perpendicular to the winding reel.

It is still a further object of the invention to provide a truck bed cargo strap rewinding tool bar having one end used to rapidly and effortlessly rewind the cargo strap on the winch reel and further having the opposite end of the tool bar to be able to couple with the winch to permit its tightening of the strap to tension the strap.

These and other objects and features of novelty which characterize the invention are highlighted with particularity in the claims following and forming a part of this disclosure in conjunction with the accompanying drawings and descriptive matters in which is illustrated the preferred embodiment of the invention.

BRIEF DESCRIPTION OF THE SEVERAL VIEWS OF THE DRAWINGS

FIG. 5 is a perspective view of the inventive tool bar having at one end the swivel hook link for securing the tool bar to the winch hub to rewind the strap and an opposite end to engage holes in the winch hub to tension the load strap; and FIG. 6 is a cut away view of the offset boss at one end of the elongated tool bar illustrating the hook member mounted on the cylindrical shaft or cantilevered rod.

DETAILED DESCRIPTION OF THE PREFERRED EMBODIMENT

With reference now to the drawings, and in particular, to FIGS. 1-6, a new tool bar for a truck bed cargo restraint system embodying the principles and concepts of the present invention will be described.

Figure 1:
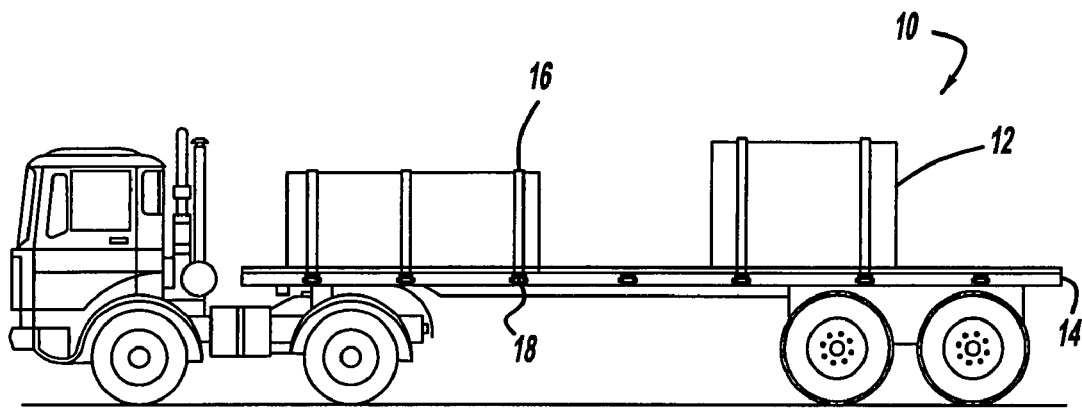
FIG. 1 is a side elevational view of a truck bed trailer having a plurality of winch assemblies mounted thereon.
Figure 2:
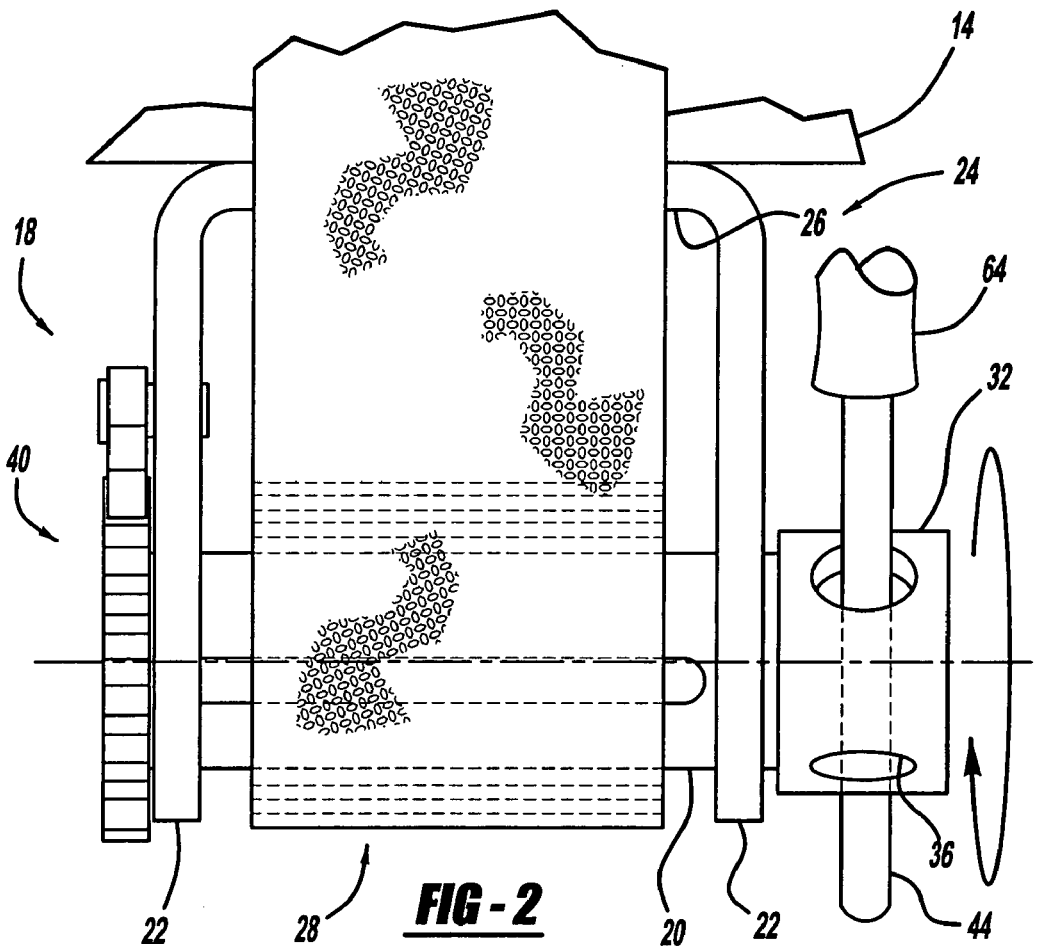
FIG. 2 is a front elevation view of a winch assembly with one end of the inventive tool bar engaged in the holes of the winch drum illustrating the use of the inventive tool bar to assist in tensioning the strap when in use to restrain cargo on the truck bed.
Figure 3:
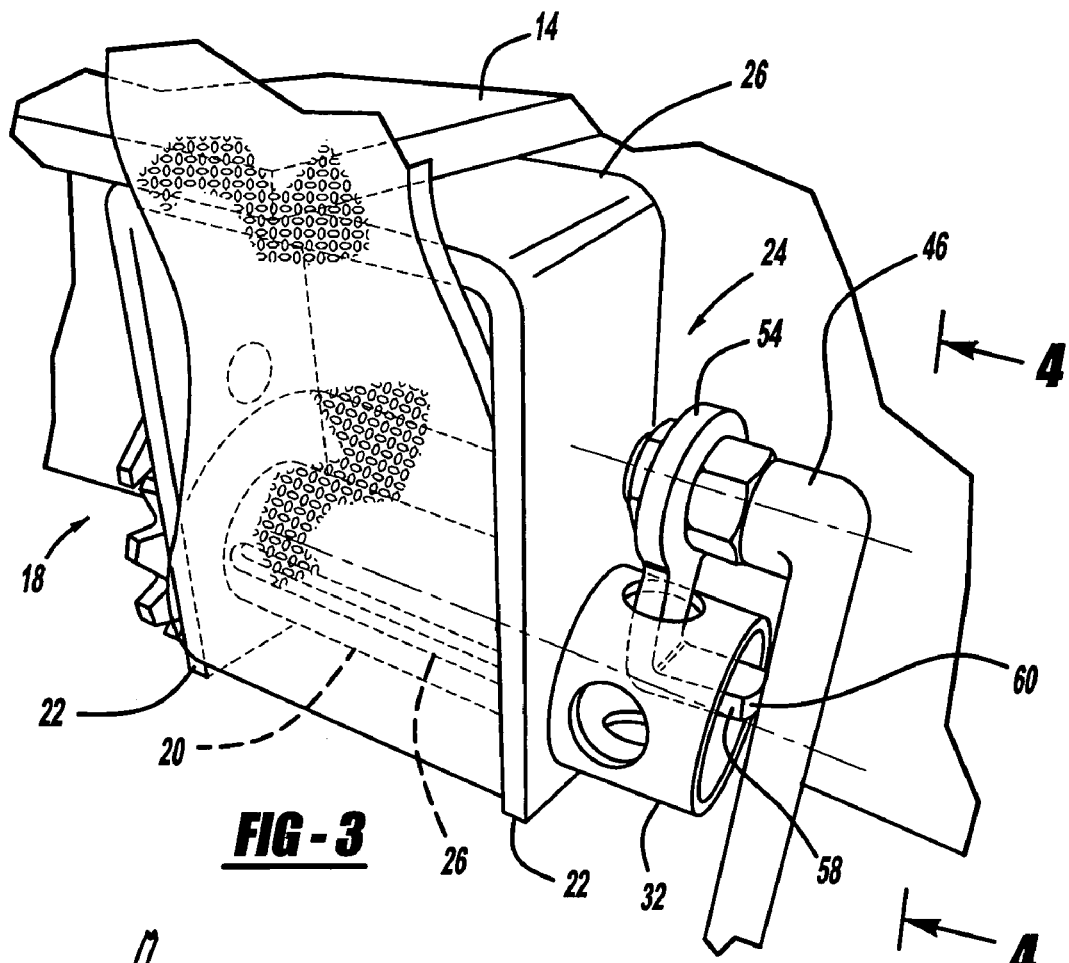
FIG. 3 is a perspective view of the invention securely engaged positively with existing winch holes in the winch drum so as to begin rewinding of a strap onto the winch reel.
Figure 4:
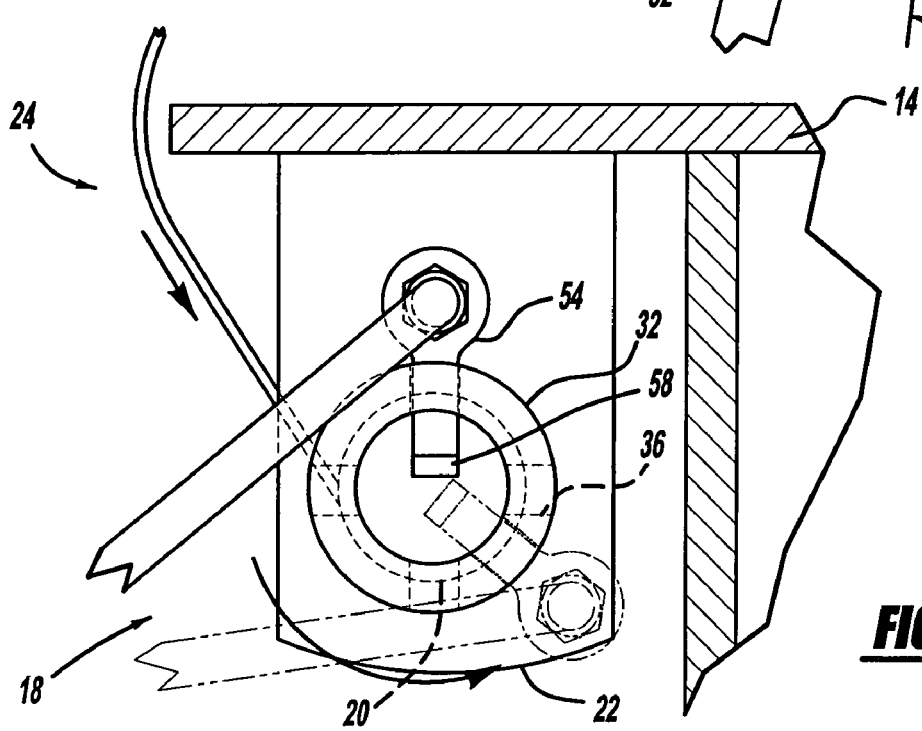
FIG. 4 is a side elevational view of the winch mounted to the underside of a truck bed with the inventive tool bar securely interlocked with the holes in the winch drum and the handle of the tool extending in a direction away from the truck bed so that in rewinding the strap, the user's hands stay well clear of the steel edges of the truck bed.

The present invention, as shown in FIG. 1, is intended to be used while transporting cargo laden vehicles 10, each load of the cargo 12 being generally secured to the truck bed 14 by some sort of tie down or load strap 16. Generally, these load straps 16 are tightened using a winch mechanism 18 mounted to the truck bed 14 either on top, along side, or underneath the truck bed 14. As shown in FIGS. 2-4, the winch mechanism 18 consists of a rotating cylinder or reel 20 mounted between two legs 22 extending from a web 26 of a U-shaped bracket 24. The web 26 of the U-shaped bracket 24 is mounted directly to the truck bed 14. The reel 20 has a central portion 28 to which the webbing of the load strap 16 is mounted and secured. Co-axially mounted with the reel 20; on the opposite side of one leg 22 is a hub 32 in the form of a hollow tube which has a plurality of apertures 36 which provides an interface for the tool bar. The plurality of apertures 36 are through apertures and spaced at 90 degree intervals about the circumferential distance of the hub 32. The reel 20 also extends beyond the other of the two legs 22 to provide a mounting surface for a conventional ratchet and pawl mechanism 40. When the reel 20 is rotated in one direction, the ratchet and pawl mechanism 40 will override the gear teeth of the ratchet to allow rewinding of the load strap 16 and when the reel 20 is rotated in the opposite direction the pawl will lock to the ratchet in order to maintain the tension on the load strap 16 as the load strap 16 is tensioned to secure the cargo 12 to the truck bed 14, as shown in FIG. 1.

The invention is intended to be used with a typical prior art winch mechanism as described above and consists of a rewinding or elongated tool bar 42 having at one end thereof a cylindrical reduced diameter portion 44 which is intended to be mounted through the plurality of apertures 36 in the hub 32, as shown in FIG. 2, and used as a pry bar when it is desired to utilize the tie down strap 16 to secure a cargo 12 on the truck bed 14. One end of the load strap 16 is secured to a side area of the trailer (not shown) in a conventional manner. The other end of the load strap 16 is extended over the cargo 12 and inserted into the central portion 28 of the reel 20 between the upstanding legs 22 of the winch mechanism 18 and wound onto the reel 20 of the winch mechanism 18. The reel 20 of the winch mechanism 18 is then rotated through the use of the elongated tool bar 42 as shown in FIG. 2 to cause a load strap 16 to be wound upon the reel 20 until the cargo 12 is securely tied down with appropriate tension and the ratchet and pawl mechanism 40 is locked in place. The ratchet and pawl mechanism 40 prevents unwinding of the reel 20 in a conventional fashion. Accordingly, the reduced diameter portion 44 of the winch rewinding tool bar 42 in conjunction with the apertures 36 in the hub 32, are used to tension the load strap 16 around the cargo 12 in a conventional manner.

The opposite end of the rewinding tool bar 42 includes an offset boss 46 terminating in a shoulder 48 from which a cylindrical shaft or cantilevered rod 50 portion extends. For purposes of the preferred embodiment, this cylindrical shaft 50 portion is threaded to receive a lock nut 52 on either side of a freely pivotable hook link member 54 having a through aperture 56 at one end thereof, mounted to the threaded cylindrical shaft 50, and at the opposite end thereof, a hook member 58 to engage the plurality of apertures 36 in the extending hub 32 of the rotating cylinder 20 of the winch mechanism 18. The 90 degree hook member 58 on the hook link member 54, as shown in FIG. 3 in the preferred embodiment, is created so that the end face 60 of the hook link member 54 faces the elongated tool bar 42. However, a further variant of this arrangement encompasses the use of a hook link member 62 which faces in a direction away from the cylindrical body of the elongated tool bar 42, as shown in phantom line in FIG. 6. In either case, the elongated tool bar 42 is assembled through an aperture 36 of the hub 32, as shown in FIG. 3, so that the elongated tool bar 42 can be rotated in a direction, as shown in FIG. 4, to rewind the tie down or load strap 16 back onto the reel 20 of the winch mechanism 18. The center portion of the elongated tool bar 42 provides an ergonomic handle 64 which can be held in one hand once the hook link member 54 is inserted into the aperture 36 of the hub 32 so that by manipulating the elongated tool bar 42 in a counter clockwise direction, as shown in FIG. 4, the load strap 16 can be rapidly rewound onto the reel 20 of the winch mechanism 18 and stored directly on the winch mechanism 18 after the cargo 12 has been removed from the truck bed 14. The rewinding can be accomplished with one hand while the other hand helps to guide the load strap 16 between the two legs 22 of the U-shaped bracket member 24 of the winch mechanism 18.

As clearly shown in FIG. 4, the inventive elongated tool bar 42 is mounted to the winch mechanism 18 in such a way as to face in a direction away from the truck bed 14 so that the hand that manipulates the rewinding tool during the rewinding process is at a safe distance from the truck bed 14 to avoid injury to the user.

In operation, and with reference to FIGS. 1-6, in use, the reduced diameter portion 44 of the elongated tool bar 42 is engaged through two opposing apertures 36 in the hub 32 of the reel 20 as shown in FIG. 2. Leverage is applied to the elongated tool bar 42 to rotate the rotating cylinder 20 through a one-quarter to one-half turn at a time while the ratchet and pawl mechanism 40 locks into place to maintain the tension being applied to the cargo 12 with the load strap 16. After the cargo 12 is properly secured to the truck bed 14, the reduced diameter portion 44 of the elongated tool bar 42 is retracted from the apertures 36 and stored in some convenient fashion. Each truck bed 14, as shown in FIG. 1, has a plurality of winch mechanisms 18 which are mounted along the longitudinal length of the truck bed 14. When it is desired to unload the cargo 12 from the truck bed 14, the hook link member 54 mounted to the opposite end of the elongated tool bar 42 is inserted into one of the apertures 36 of the hub 32 of the reel 20 after the opposite end of the load strap 16 is released on the opposite side of the truck bed 14 or after the cargo 12 has been unloaded so that by conveniently rotating the elongated tool bar 42 with one hand and guiding the load strap 16 onto the reel 20, the load strap 16 can be easily and rapidly, as well as safely rewound onto the winch mechanism 18 and stored between uses.

Thus, it can be seen that the novel tool bar has been provided for use in conjunction with a typical winch assembly on a flat bed trailer which can be mounted any place along the trailer and safely operated without the possibility of creating damage to the user's hands.

What is claimed is:

1. A winch tool bar adapted to engage a load binding winch mounted to a trailer bed and engaging an at least one aperture in a hub of a winch reel for rewinding a cargo strap, said winch tool comprising:
   an elongated bar member having:
      a central axis;
      a reduced diameter portion at one end thereof, said reduced diameter portion cooperating with said at least one aperture in said hub of said winch reel when said winch reel is rotated to bind said load to said trailer bed;
      an offset boss located at the opposite end of said elongated bar member, said offset boss having:
         a shoulder facing in a direction away from said elongated bar member;
      an ergonomic handle mounted to said elongated bar member between said one end and said opposite end;
   a cantilevered rod member mounted to said offset boss of said elongated bar member;
   a rotatable link member having an aperture at one end thereof and a hook portion at an opposite end thereof, said rotatable link member mounted to said cantilevered rod member for rotational movement relative thereto; and
   means for retaining said rotatable link member on said cantilevered rod member such that when said hook portion of said rotatable link member is mounted in said aperture of said hub of said winch reel, said rotatable link member is manipulated by said elongated bar member as said elongated bar member is rotated by a user's hand holding said ergonomic handle to rewind said cargo strap on said winch reel in a smooth rapid manner.

2. The winch tool bar as claimed in claim 1, wherein said means for retaining further comprises:
   at least two retaining members, one each mounted on said cantilevered rod member alongside a complementary side of said rotatable link member; and
   means for positioning said at least two retaining members a predetermined distance from said rotatable link member whereby said rotatable link member may be manipulated to engage said hook portion of said rotatable link member into said aperture of said hub of said winch reel.

3. A winch tool bar adapted to engage a load binding winch mounted to a trailer bed and engaging an aperture in a hub of a winch reel for rewinding a cargo strap, said winch tool comprising:
   an elongated bar member having:
      a central axis;
      a reduced diameter portion at one end thereof, said reduced diameter portion cooperating with said apertures in said hub of said winch reel when said winch reel is rotated to bind said load to said trailer bed; and an offset boss located at the opposite end of said elongated bar member, said offset boss having a shoulder facing in a direction away from said elongated bar member;

an ergonomic handle mounted to said elongated bar member between said one end and said opposite end;

a cantilevered rod member mounted to said offset boss of said elongated bar member, said cantilevered rod member extending in a direction away from said shoulder;

a rotatable link member having an aperture at one end thereof and a hook portion at an opposite end thereof, said rotatable link member mounted to said cantilevered rod member for rotational movement relative thereto; and means for retaining said rotatable link member on said cantilevered rod member such that when said hook portion of said rotatable link member is mounted in said aperture of said hub in said winch reel, said rotatable link member is manipulated by said elongated bar member to securely mount said hook portion of said rotatable link member in said aperture whereby said ergonomic handle can be held in one hand to effect a rotary motion of said elongated bar member which in turn rotates said winch reel to rewind said cargo strap on said winch reel in a smooth, safe and rapid manner.

4. The winch tool bar as claimed in claim 3, wherein said cantilevered rod member is a threaded rod member and said rotatable link member further comprises:

a threaded hole located in said offset boss of said elongated bar member, said threaded hole having an axis transverse to said central axis of said elongated bar member; and said threaded rod member further being securely mounted in said threaded hole of said elongated bar member.

5. The winch tool bar as claimed in claim 4, wherein said means for retaining said rotatable link member on said cantilevered rod member further comprises:

a first threaded nut member mounted to said threaded rod member spaced a predetermined distance from a complementary side of said rotatable link member;

a second threaded nut member mounted to said threaded rod member spaced a predetermined distance from an opposing complementary side of said rotatable link member whereby said rotatable link member is straddled by said first and second nut member with sufficient space therebetween to allow said rotatable link member to be manipulated to securely mount said hook portion of said rotatable link member into one of said apertures of said hub.

6. In combination with a winch tool bar and a cargo strap winding winch of the type having a cylindrical hub extended from a reel for spooling up a length of cargo strap, said cylindrical hub having a plurality of apertures therethrough for applying a winding torque to said cylindrical hub, said winch tool bar comprising:

an elongated bar member having:
  a central axis;
  a reduced diameter portion at one end thereof; and
  an offset boss located at the opposite end of said elongated bar member, said offset boss having a shoulder facing in a direction away from said elongated bar member;

means for engaging one of said plurality of apertures in said cylindrical hub, said engaging means mounted to said shoulder of said offset boss located at said opposite end of said elongated bar member; and an ergonomic handle mounted to said elongated bar member between said one end and said opposite end whereby after said engaging means is located into said one of said plurality of apertures of said cylindrical hub, said elongated bar may be held by said ergonomic handle by the hand of a user to effect a rotary motion of said elongated bar member which in turn rotates said reel of said cargo strap winding winch in a smooth, safe and rapid manner to rewind said cargo strap onto said reel.

7. The winch tool bar as claimed in claim 6, wherein said means for engaging said aperture in said hub further comprises:

a cantilevered rod member mounted to said offset boss of said elongated bar member;

a rotatable link member having an aperture at one end thereof and a hook portion at an opposite end thereof, said rotatable link member mounted to said cantilevered rod member for rotational movement relative thereto; and means for retaining said rotatable link member on said cantilevered rod member such that when said hook portion of said rotatable link member is mounted in said aperture of said hub of said reel, said rotatable link member is manipulated by said elongated bar member as said elongated bar member is rotated by the user hand holding said ergonomic handle to rewind said cargo strap on said reel of said cargo strap winding winch in a smooth rapid manner.

8. The winch tool bar as claimed in claim 7, wherein said means for retaining further comprises:

at least two retaining members, one each mounted on said cantilevered rod member alongside a complementary side of said rotatable link member; and means for positioning said at least two retaining members a predetermined distance from said rotatable link member whereby said rotatable link member may be manipulated to engage said hook portion of said rotatable link member into said aperture of said hub of said reel.

* * * * *